US009611043B2

(12) United States Patent
Piesker

(10) Patent No.: US 9,611,043 B2
(45) Date of Patent: Apr. 4, 2017

(54) AIRCRAFT THERMAL CONTROL SYSTEM AND METHOD OF OPERATING AN AIRCRAFT THERMAL CONTROL SYSTEM

(71) Applicant: AIRBUS OPERATIONS GMBH, Hamburg (DE)

(72) Inventor: Markus Piesker, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 846 days.

(21) Appl. No.: 13/853,568

(22) Filed: Mar. 29, 2013

(65) Prior Publication Data

US 2014/0090802 A1 Apr. 3, 2014

Related U.S. Application Data

(60) Provisional application No. 61/622,530, filed on Apr. 11, 2012.

(30) Foreign Application Priority Data

Apr. 11, 2012 (DE) ........................ 10 2012 007 251

(51) Int. Cl.
*F28F 27/00* (2006.01)
*B60H 1/00* (2006.01)
*B64D 13/08* (2006.01)
*B64D 13/06* (2006.01)

(52) U.S. Cl.
CPC ............. *B64D 13/08* (2013.01); *B64D 13/06* (2013.01); *B64D 2013/0614* (2013.01); *B64D 2013/0629* (2013.01); *B64D 2013/0674* (2013.01); *Y02T 50/44* (2013.01); *Y02T 50/56* (2013.01)

(58) Field of Classification Search
CPC B64D 13/08; B64D 13/06; B64D 2013/0674; B64D 2013/0614; Y02T 50/44; Y02T 50/56
USPC .................................... 165/200, 202
See application file for complete search history.

(56) References Cited

U.S. PATENT DOCUMENTS

| 3,203,473 | A | * | 8/1965 | Goode | ................... | B64D 13/08 |
| | | | | | | 165/296 |
| 3,948,295 | A | * | 4/1976 | Lemont | ................... | F16L 59/02 |
| | | | | | | 138/147 |
| 5,369,960 | A | * | 12/1994 | Mueller | ................. | B64D 13/00 |
| | | | | | | 165/168 |

(Continued)

FOREIGN PATENT DOCUMENTS

| CN | 101148197 | 3/2008 |
| DE | 10 2006 005 035 | 9/2007 |

(Continued)

OTHER PUBLICATIONS

Chinese Office Action dated Jan. 19, 2015.

*Primary Examiner* — Len Tran
*Assistant Examiner* — Claire Rojohn, III
(74) *Attorney, Agent, or Firm* — Dickinson Wright PLLC

(57) ABSTRACT

An aircraft thermal control system includes a thermal control unit including an internal circuit, an evaporator and a condenser, the evaporator and the condenser being disposed in the internal circuit. The aircraft thermal control system further includes a cooling circuit which is thermally coupled to the evaporator of the thermal control unit, and a heating circuit which is thermally coupled to the condenser of the thermal control unit.

9 Claims, 2 Drawing Sheets

(56) References Cited

U.S. PATENT DOCUMENTS

| | | | |
|---|---|---|---|
| 6,845,627 B1 | 1/2005 | Buck | |
| 8,118,257 B2 * | 2/2012 | Wilmot, Jr. | B64D 13/06 244/118.5 |
| 8,720,217 B2 * | 5/2014 | Reed | B64D 11/02 62/244 |
| 2003/0051492 A1 * | 3/2003 | Hartenstein | B64D 13/06 62/172 |
| 2005/0210910 A1 * | 9/2005 | Rigney | B60H 1/00014 62/407 |
| 2006/0201173 A1 * | 9/2006 | Leathers | B64F 1/364 62/186 |
| 2006/0230770 A1 * | 10/2006 | Kitsch | F25B 13/00 62/151 |
| 2007/0137234 A1 | 6/2007 | Zywiak | |
| 2009/0000329 A1 | 1/2009 | Colberg | |
| 2010/0071638 A1 * | 3/2010 | Bulin | B64D 13/06 123/41.04 |
| 2010/0101251 A1 * | 4/2010 | Kelnhofer | B64D 13/06 62/133 |
| 2010/0251737 A1 * | 10/2010 | Roering | B64D 13/06 62/115 |
| 2011/0005244 A1 * | 1/2011 | Finney | B64D 13/08 62/87 |
| 2011/0107782 A1 * | 5/2011 | Ebigt | B64D 13/08 62/222 |
| 2011/0240795 A1 * | 10/2011 | Brugger | B64D 13/08 244/58 |
| 2013/0340470 A1 * | 12/2013 | Piesker | F25B 39/02 62/515 |

FOREIGN PATENT DOCUMENTS

| | | |
|---|---|---|
| DE | 10 2008 053 320 | 5/2010 |
| DE | 10 2009 011 797 | 9/2010 |
| DE | 10 2010 054 448 | 6/2012 |
| EP | 1 801 009 | 6/2007 |
| WO | 2005/047784 | 5/2005 |
| WO | 2007/088012 | 8/2007 |
| WO | 2009/030448 | 3/2009 |

* cited by examiner

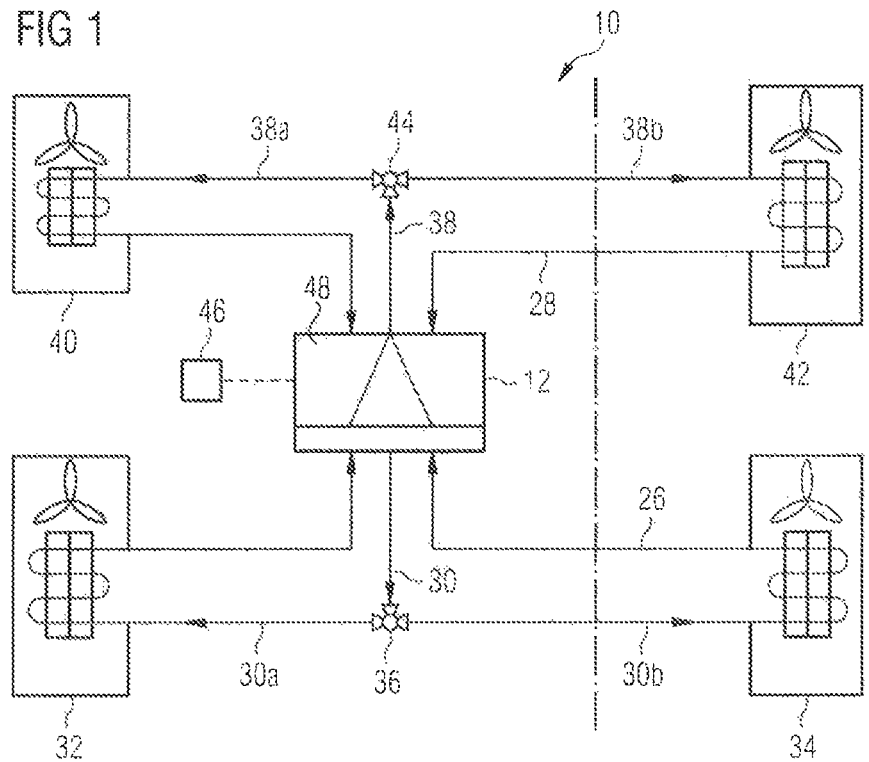
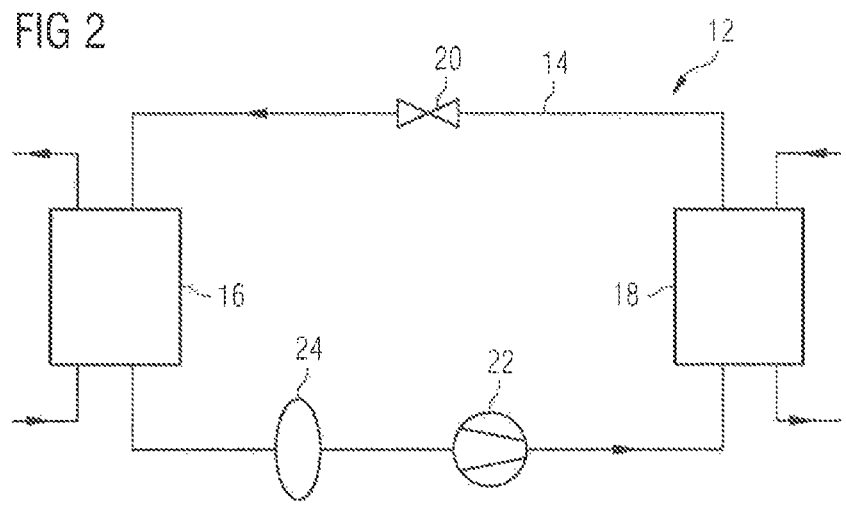

AIRCRAFT THERMAL CONTROL SYSTEM AND METHOD OF OPERATING AN AIRCRAFT THERMAL CONTROL SYSTEM

CROSS REFERENCE TO RELATED APPLICATIONS

This application is entitled to and claims the benefit of German Application No. DE 10 2012 007 251.1 filed Apr. 11, 2012 and U.S. Provisional Application No. 61/622,530, filed Apr. 11, 2012, the disclosures of each of which, including the specification, claims, drawings and abstract, are incorporated herein by reference in their entirety.

FIELD

This application relates to an aircraft thermal control system and a method of operating an aircraft thermal control system.

BACKGROUND

So-called air-based air conditioning systems as described for example in DE 10 2008 053 320 A1 or non-published DE 10 2010 054 448 are usually used at present in commercial aircraft to air-condition the aircraft cabin. An aircraft air conditioning system serves to cool the aircraft cabin, which would otherwise be overheated due to thermal loads, such as, for example, body heat of the passengers and waste heat from equipment present on board the aircraft.

Further, DE 10 2006 005 035 B3, WO 2007/088012 A1, DE 10 2009 011 797 A1 and US 2010/0251737 A1 describe cooling systems for operation with a two-phase refrigerant which may be used, for example, to cool food that is stored on board a passenger aircraft and intended to be supplied to the passengers. Electric or electronic components on board the aircraft such as, for example, an avionic system may be cooled either by means of the aircraft air conditioning system or by means of a cooling system as described, for example, in DE 10 2006 005 035 B3, WO 2007/088012 A1, DE 10 2009 011 797 A1 and US 2010/0251737 A1.

SUMMARY

This application is directed to the object to provide an aircraft thermal control system which may be operated in a particularly flexible manner. Further, this application is directed to the object to provide a method of operating an aircraft thermal control system of this kind.

These objects are achieved by an aircraft thermal control system having features of attached claims and a method of operating an aircraft thermal control system having features of attached claims.

An aircraft thermal control system, according to this application, comprises a thermal control unit including an internal circuit, an evaporator and a condenser. The evaporator and the condenser are disposed in the internal circuit. A throttle valve and a compressor may also be disposed in the internal circuit of the thermal control unit. Finally, an accumulator may be provided in the internal circuit of the thermal control unit. Basically, the thermal control unit may be operated as a chiller. Preferably, however, the thermal control unit is designed for operation as a heat pump. This may be achieved in a well-known manner by suitably designing the individual components of the thermal control unit with regard to their performance, their operating range and the like. The thermal control unit may be designed for operation with a two-phase refrigerant circulating through the internal circuit of the thermal control unit. In the evaporator of the thermal control unit the refrigerant circulating through the internal circuit is transferred from the liquid to the gaseous state of aggregation in an endothermal thermodynamic reaction. In the condenser of the thermal control unit the refrigerant circulating through the internal circuit is transferred from the gaseous to the liquid state of aggregation in an exothermal thermodynamic reaction.

A cooling circuit is thermally coupled to the evaporator of the thermal control unit. A coolant circulating in the cooling circuit thus may be cooled by the transfer of cooling energy which is released upon evaporation of the refrigerant circulating through the internal circuit of the thermal control unit in the evaporator. The thermal coupling between the evaporator of the thermal control unit and the cooling circuit may be achieved, for example, by designing the evaporator in the form of a heat exchanger.

In addition, a heating circuit is thermally coupled to the condenser of the thermal control unit. A heating medium circulating in the heating circuit thus may be heated by the transfer of heating energy which is released upon condensation of the refrigerant circulating through the internal circuit of the thermal control unit in the condenser. The thermal coupling between the condenser of the thermal control unit and the heating circuit may be achieved, for example, by designing the condenser in the form of a heat exchanger.

On board an aircraft typically a plurality of cooling and heating tasks occur which may vary in dependence on the operational state of the aircraft and in dependence on the ambient temperature. Typical cooling energy consumers on board an aircraft are, for example, heat generating electric or electronic components, food to be supplied to the passengers or the aircraft cabin during ground operation of the aircraft at high ambient temperatures. Typical heating energy consumers on board an aircraft are, for example, temperature sensitive electric or electronic components, the water system, the wings or the aircraft cabin during flight or during ground operation of the aircraft at low ambient temperatures. The aircraft thermal control system, according to this application, employs a single thermal control unit for both cooling and heating purposes. Thus, the aircraft thermal control system can be utilized in a particularly flexible manner for either cooling or heating purposes, as required. Further, the aircraft thermal control system even allows simultaneous cooling of a cooling energy consumer and heating of a heating energy consumer. As a result, the aircraft thermal control system may be operated in a particularly energy efficient manner.

Preferably, the thermal control unit is adapted for operation with $CO_2$ as the two-phase refrigerant circulating in the internal circuit of the thermal control unit. Contrary to conventional two-phase refrigerants such as, for example, R134a, $CO_2$ is eco-friendly. If desired, $CO_2$ can also be employed as the coolant circulating in the cooling circuit and/or the heating medium circulating in the heating circuit.

A coolant supply line of the cooling circuit which exits the thermal control unit may comprise a first line branch thermally connected to a first cooling energy consumer and a second line branch thermally connected to a second cooling energy consumer. The thermal connection between the cooling circuit and the cooling energy consumers may, for example, be achieved by means of suitable heat exchangers. If desired, the heat exchangers may be designed in the form of evaporators allowing the coolant circulating in the cooling circuit to be transferred from the liquid to the gaseous state of aggregation upon releasing cooling energy to the cooling energy consumers. If desired, more than two cooling energy consumers may be thermally connected to the coolant supply line via respective line branches.

A control valve may be adapted to control a flow of coolant from the thermal control unit to the first and the second cooling energy consumer. By means of the valve the cooling energy consumers may be prioritized regarding the supply of cooling energy provided by the thermal control unit. Further, a cooling energy consumer which, for example during a specific operation phase of the aircraft or at specific ambient temperatures, does not have a cooling demand, by means of the valve may be cut off from the cooling circuit. Preferably the control valve is designed so as to allow a stepwise or continuously variable flow of coolant from the thermal control unit to the first and the second cooling energy consumer. If more than two cooling energy consumers are thermally connected to the coolant supply line, a suitable valve or suitable valves may be provided to control the flow of coolant from the thermal control unit to all cooling energy consumers.

A heating medium supply line of the heating circuit which exits the thermal control unit may comprise a first line branch thermally connected to a first heating energy consumer and a second line branch thermally connected to a second heating energy consumer. The thermal connection between the heating circuit and the heating energy consumers may, for example, be achieved by means of suitable heat exchangers. If desired, the heat exchangers may be designed in the form of condensers allowing the heating medium circulating in the heating circuit to be transferred from the gaseous to the liquid state of aggregation upon releasing heating energy to the heating energy consumers. If desired, more than two heating energy consumers may be thermally connected to the heating medium supply line via respective line branches.

A control valve may be adapted to control a flow of heating medium from the thermal control unit to the first and the second heating energy consumer. By means of the valve the heating energy consumers may be prioritized regarding the supply of heating energy provided by the thermal control unit. Further, a heating energy consumer which, for example during a specific operation phase of the aircraft or at specific ambient temperatures, does not have a heating demand, by means of the valve may be cut off from the heating circuit. Preferably the control valve is designed so as to allow a stepwise or continuously variable flow of heating medium from the thermal control unit to the first and the second heating energy consumer. If more than two heating energy consumers are thermally connected to the heating medium supply line, a suitable valve or suitable valves may be provided to control the flow of heating medium from the thermal control unit to all heating energy consumers.

The first or the second cooling energy consumer preferably is the aircraft environment. Cooling energy provided by the thermal control unit may be transferred to the aircraft environment by means of a suitable heat exchanger, for example, an outer skin heat exchanger or a heat exchanger which is flown through with ambient air. Using the aircraft environment as one of the cooling energy consumers supplied with cooling energy from the thermal control unit allows excess cooling energy which cannot be used on board the aircraft, for example during specific operational phases of the aircraft, to be dissipated to the ambient.

Alternatively or additionally thereto, the first or the second heating energy consumer preferably is the aircraft environment. Heating energy provided by the thermal control unit may be transferred to the aircraft environment by means of a suitable heat exchanger, for example, an outer skin heat exchanger or a heat exchanger which is flown through with ambient air. Using the aircraft environment as one of the heating energy consumers supplied with heating energy from the thermal control unit allows excess heating energy which cannot be used on board the aircraft, for example during specific operational phases of the aircraft, to be dissipated to the ambient.

The cooling circuit of the aircraft thermal control system may be thermally coupled to evaporators of a plurality of thermal control units. Alternatively or additionally thereto, the heating circuit may be thermally coupled to condensers of a plurality of thermal control units. In an aircraft thermal control system employing multiple thermal control units malfunction of a single thermal control unit can easily be compensated for. Further, the individual thermal control units may have a smaller cooling/heating capacity and hence comprise a smaller amount of refrigerant. Hence, leakage of the internal circuit of an individual thermal control unit does not result in a large amount of refrigerant being released to the environment. Finally, a high cooling and/or heating performance may be achieved. As a result, a specific set temperature may be selected for the coolant circulating through the cooling circuit and/or the heating medium circulating through the heating circuit which can be maintained during all operational phases of the aircraft thermal control system.

In a method of operating an aircraft thermal control system, according to this application, a thermal control unit including an internal circuit, an evaporator and a condenser is provided. The evaporator and the condenser are disposed in the internal circuit. A coolant is circulated through a cooling circuit which is thermally coupled to the evaporator of the thermal control unit. A heating medium is circulated through a heating circuit which is thermally coupled to the condenser of the thermal control unit.

$CO_2$ may be used as a refrigerant circulating in the internal circuit of the thermal control unit.

The coolant exiting the thermal control unit may be directed through a coolant supply line of the cooling circuit which comprises a first line branch thermally connected to a first cooling energy consumer and a second line branch thermally connected to a second cooling energy consumer. A control valve may control a flow of the coolant from the thermal control unit to the first and the second cooling energy consumer.

The heating medium exiting the thermal control unit may be directed through a heating medium supply line of the heating circuit which comprises a first line branch thermally connected to a first heating energy consumer and a second line branch thermally connected to a second heating energy consumer. A control valve may control a flow of the heating medium from the thermal control unit to the first and the second heating energy consumer.

The first or the second cooling energy consumer may be the aircraft environment. Alternatively or additionally thereto, the first or the second heating energy consumer may be the aircraft environment.

The cooling circuit may be thermally coupled to evaporators of a plurality of thermal control units. Alternatively or additionally thereto, the heating circuit may be thermally coupled to condensers of a plurality of thermal control units.

An aircraft, according to this application, comprises an above described aircraft thermal control system. In the aircraft, a plurality of independent aircraft thermal control systems may be employed. Plural independent aircraft thermal control systems have the advantages discussed above in connection with an aircraft thermal control system employing multiple thermal control units. In addition, an independent aircraft thermal control system may be specifically designed in accordance with respective demands and, if required, may easily be replaced without affecting other systems on board the aircraft.

A thermal control unit of the aircraft thermal control system may be installed in a passenger cabin, a freight compartment, a belly fairing and/or a tail cone of the aircraft. Specifically, if possible, the installation site of the thermal control unit may be selected such that the line lengths of the cooling and the heating circuit are kept small.

The thermal control unit of the aircraft thermal control system may be provided with a sound dampening housing, the sound dampening properties of which are adjusted in dependence on the installation site of the thermal control unit within the aircraft. For example, a thermal control unit installed in the passenger cabin or close to the passenger cabin may be provided with a sound dampening housing having a high sound dampening performance. Contrary thereto, a thermal control unit installed, for example, behind the aircraft's secondary structure in the belly fairing or the tail cone of the aircraft may have no sound dampening housing at all or a small sized, light weight sound dampening housing having only a low sound dampening performance.

BRIEF DESCRIPTION OF THE DRAWINGS

A preferred embodiment of this application now is explained in more detail with reference to the enclosed schematic drawings wherein FIG. 1 shows an aircraft thermal control system, FIG. 2 shows a thermal control unit employed in the aircraft thermal control system according to FIG. 1.

DETAILED DESCRPT OF EMBODIMENTS

Figure 3:
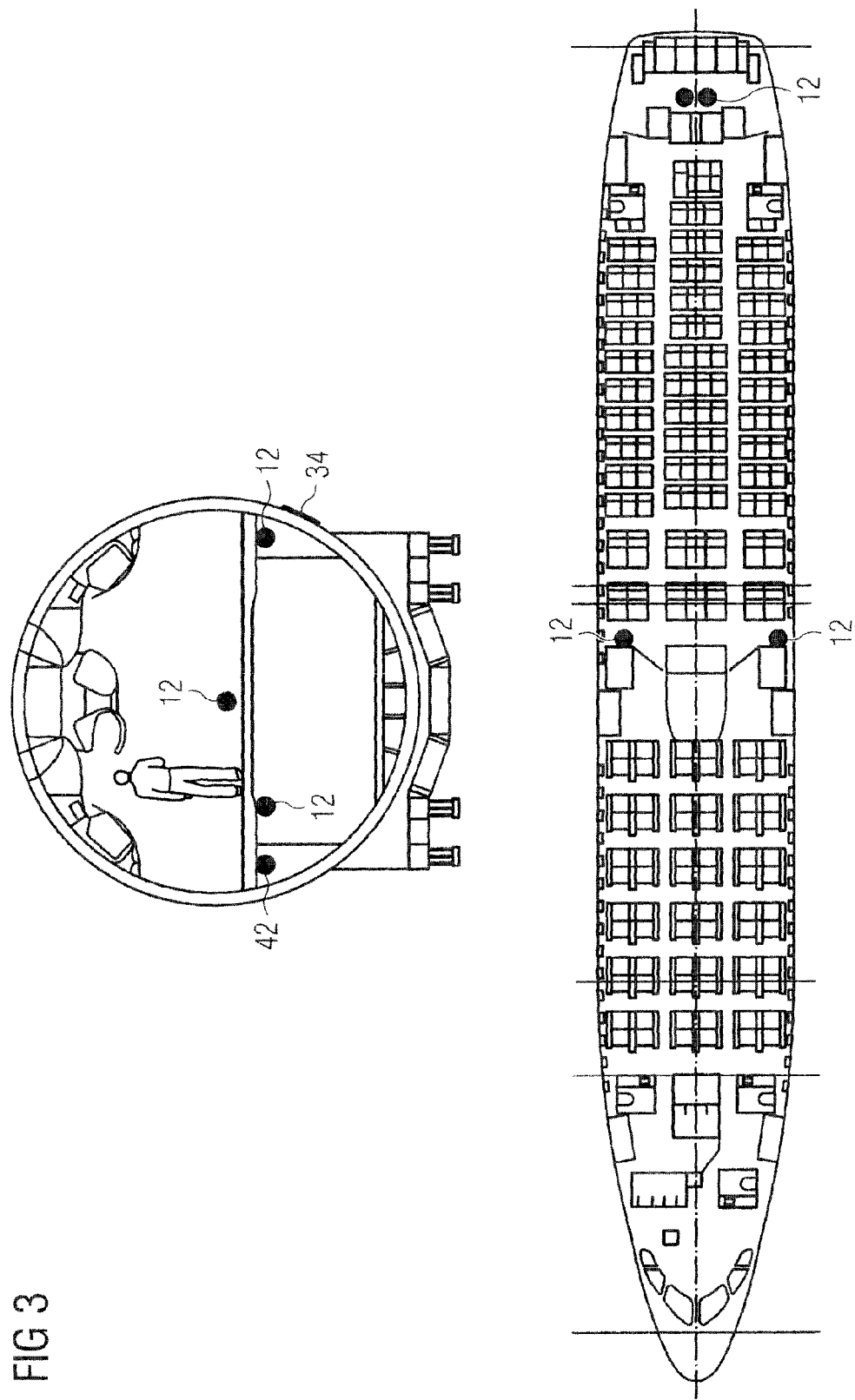
FIG. 3 shows possible installation sites of the aircraft thermal control system according to FIG. 1 in an aircraft.

FIG. 1 depicts an aircraft thermal control system 10 which comprises a thermal control unit 12. As becomes apparent from FIG. 2, the thermal control unit 12 includes an internal circuit 14, an evaporator 16 and a condenser 18, the evaporator 16 and the condenser 18 being disposed in the internal circuit 14. Further, a throttle valve 20, a compressor 22 and an accumulator 24 are disposed in the internal circuit 14 of the thermal control unit 12. The thermal control unit 12 is designed for operation as a heat pump and for operation with eco-friendly $CO_2$ as a two-phase refrigerant circulating in the internal circuit 14 of the thermal control unit 12. In the evaporator 16 of the thermal control unit 12 $CO_2$ circulating through the internal circuit 14 is transferred from the liquid to the gaseous state of aggregation in an endothermal thermodynamic reaction. In the condenser 18 of the thermal control unit 12 $CO_2$ circulating through the internal circuit 14 is transferred from the gaseous to the liquid state of aggregation in an exothermal thermodynamic reaction.

The evaporator 16 of the thermal control unit 12 is designed in the form of a heat exchanger and is thermally coupled to a cooling circuit 26. A coolant circulating in the cooling circuit 26 thus may be cooled by the transfer of cooling energy which is released upon evaporation of the $CO_2$ circulating through the internal circuit 14 of the thermal control unit 12 in the evaporator 16. The condenser 18 of the thermal control unit 12 is also designed in the form of a heat exchanger and is thermally coupled to a heating circuit 28. A heating medium circulating in the heating circuit 28 thus may be heated by the transfer of heating energy which is released upon condensation of the $CO_2$ circulating through the internal circuit 14 of the thermal control unit 12 in the condenser 18.

The cooling circuit 26 comprises a coolant supply line 30 which exits the thermal control unit 12. The coolant supply line 30 comprises a first line branch 30a thermally connected to a first cooling energy consumer via a first heat exchanger 32 and a second line branch 30b thermally connected to a second cooling energy consumer via a second heat exchanger 34. A control valve 36 is disposed in the coolant supply line 30 and serves to control the flow of coolant from the thermal control unit 12 to the first and the second heat exchanger 32, 34 and thus the supply of cooling energy to the first and the second cooling energy consumer.

Similarly, the heating circuit 28 comprises a heating medium supply line 38 which exits the thermal control unit 12. The heating medium supply line 38 comprises a first line branch 38a thermally connected to a first heating energy consumer via a third heat exchanger 40 and a second line branch 38b thermally connected to a second heating energy consumer via a fourth heat exchanger 42. A control valve 44 is disposed in the heating medium supply line 38 and serves to control the flow of heating medium from the thermal control unit 12 to the third and the fourth heat exchanger 40, 42 and thus the supply of heating energy to the first and the second heating energy consumer.

In the exemplary embodiment of a thermal control system 10 according to FIG. 1 the first cooling energy consumer and the first heating energy consumer is the aircraft cabin. In dependence on the operational state of the aircraft the thermal control unit 12 thus can be used to either cool or heat the aircraft cabin. For example, at high ambient temperatures the thermal control system 10, under the control of a control unit 46, may be used to supply cooling energy to the aircraft cabin via the cooling circuit 26. Contrary thereto, at low ambient temperatures the control unit 46 may control the thermal control system 10 such that heating energy is supplied to the aircraft cabin via the heating circuit 28.

In an alternative embodiment the first cooling energy consumer may be different from the first heating energy consumer. For example, the first cooling energy consumer may be a heat generating electric or electronic component of the aircraft, while the first heating energy consumer may be the aircraft cabin. The thermal control system 10 then may be, for example, controlled so as to simultaneously cool the electric or electronic component and heat the aircraft cabin.

The second cooling energy consumer and the second heating energy consumer, in the thermal control system 10 of FIG. 1, are the aircraft environment. Cooling energy provided by the thermal control unit 12 is transferred to the aircraft environment by means of the second heat exchanger 34 which may be formed as an outer skin heat exchanger or a heat exchanger flown through with ambient air. Heating energy provided by the thermal control unit 12 is transferred to the aircraft environment by means of the fourth heat exchanger 42 which also may an outer skin heat exchanger or a heat exchanger flown through with ambient air. Using the aircraft environment as one of the cooling energy consumers allows excess cooling energy which cannot be used on board the aircraft, for example during specific operational phases of the aircraft, to be dissipated to the ambient. Similarly, using the aircraft environment as one of the heating energy consumers allows excess heating energy which cannot be used on board the aircraft, for example during specific operational phases of the aircraft, to be dissipated to the ambient.

As becomes apparent from FIG. 3, an aircraft may comprise a plurality of independent aircraft thermal control systems 10. The thermal control units 12 of the aircraft thermal control systems 12 may be installed in the passenger cabin, a freight compartment, a belly fairing and/or a tail cone of the aircraft. The thermal control units 12 of the aircraft thermal control systems 10 are provided with a sound dampening housing 48, the sound dampening properties of which are adjusted in dependence on the installation site of the thermal control units 12 within the aircraft.

The invention claimed is:

1. An aircraft thermal control system comprising:
    a thermal control unit including an internal circuit, an evaporator and a condenser, the evaporator and the condenser being disposed in the internal circuit,
    a cooling circuit which is thermally coupled to the evaporator of the thermal control unit and which comprises a coolant supply line which exits the thermal control unit, and
    a heating circuit which is thermally coupled to the condenser of the thermal control unit and which comprises a heating medium supply line which exits the thermal control unit, wherein:
    the coolant supply line of the cooling circuit which exits the thermal control unit comprises a first line branch thermally connected to a first cooling energy consumer and a second line branch thermally connected to a second cooling energy consumer,
    a control valve is adapted to control a flow of coolant from the thermal control unit to the first and the second cooling energy consumer,
    the heating medium supply line of the heating circuit which exits the thermal control unit comprises a first line branch thermally connected to a first heating energy consumer and a second line branch thermally connected to a second heating energy consumer,
    a further control valve is adapted to control respective flows of heating medium from the thermal control unit to the first heating energy consumer and the second heating energy consumer, and
    wherein each of the first cooling energy consumer and the first heating energy consumer is an aircraft cabin, such that the thermal control unit can either cool or heat the aircraft cabin.

2. The system according to claim 1, wherein the thermal control unit is structured for operation with CO2 as a refrigerant circulating in the internal circuit.

3. The system according to claim 1, wherein the cooling circuit is thermally coupled to evaporators of a plurality of thermal control units, and/or in that the heating circuit is thermally coupled to condensers of a plurality of thermal control units.

4. An aircraft comprising an aircraft thermal control system according to claim 1.

5. The aircraft according to claim 4,
    wherein a thermal control unit of the aircraft thermal control system is installed in an installation site.

6. The aircraft according to claim 5,
    wherein the thermal control unit of the aircraft thermal control system is provided with a sound dampening housing having sound dampening properties which are adjusted in dependence on the installation site of the thermal control unit within the aircraft.

7. The aircraft according to claim 5,
    wherein the installation site is a passenger cabin, as freight compartment, a belly fairing and/or a tail cone of the aircraft.

8. The system according to claim 1,
    wherein the heating medium is heated by the condenser.

9. The system according to claim 1,
    wherein the control valve is adapted to prioritize the respective flows of heating medium to the first and the second heating energy consumer.

* * * * *